United States Patent
Swain

[19]

[11] Patent Number: 6,157,733

[45] Date of Patent: Dec. 5, 2000

[54] INTEGRATION OF MONOCULAR CUES TO IMPROVE DEPTH PERCEPTION

[75] Inventor: Cassandra Turner Swain, Aberdeen, N.J.

[73] Assignee: AT&T Corp., New York, N.Y.

[21] Appl. No.: 08/844,422

[22] Filed: Apr. 18, 1997

[51] Int. Cl.$^7$ .............. G06K 9/34; G06K 9/46; G06K 9/60; G06T 5/00

[52] U.S. Cl. .......... 382/154; 382/173; 382/199; 382/254; 382/275; 382/284

[58] Field of Search ................. 382/151, 152, 382/154, 173, 190, 274, 282, 284, 285, 255, 199, 203, 277, 298

[56] References Cited

U.S. PATENT DOCUMENTS

| | | | |
|---|---|---|---|
| 4,731,864 | 3/1988 | Modla | 382/54 |
| 5,548,667 | 8/1996 | Tu | 382/285 |
| 5,592,567 | 1/1997 | Kilger | 382/199 |
| 5,684,898 | 11/1997 | Brady et al. | 382/282 |
| 5,960,111 | 9/1999 | Chen et al. | 382/173 |
| 5,982,926 | 11/1999 | Kuo et al. | 382/167 |

FOREIGN PATENT DOCUMENTS

| | | |
|---|---|---|
| 0 576 961 A2 | 1/1994 | European Pat. Off. . |
| 0 708 416 A2 | 4/1996 | European Pat. Off. . |

OTHER PUBLICATIONS

Patent Abstracts of Japan, vol. 096, No. 005, May 31, 1996 & UP 08 016812 A (Hudson Soft Co Ltd), Jan. 19, 1996.

D. Marr and T. Poggio, "Cooperative Computation of Stereo Disparity," Science, vol. 194, pp. 283–287 (1976).

S. Barnard and M. Fischler, "Computational Stereo," Computing Surveys, vol. 14, No. 4, pp. 553–572 (Dec., 1982).

A. Pentland, "a New Sense For Depth of Field," IEEE Transactions on Pattern Analysis and Machine Intelligence, vol. 9, No. 4 (Jul., 1987).

G. Surya and M. Subbarao, "Depth From Defocus By Changing Camera Aperture: a Spatial Domain Approach," Proceedings of IEEE Transactions on Pattern Analysis and Machine Intelligence, pp. 61–67 (1993).

N. Gershon, "Visualizing 3D PET Images," IEEE Computer Graphics and Applications, vol. 11, No. 3, pp. 11–13 (1991).

S. Marapane and M. Trivedi, "An Active Vision System For Depth Extraction Using Multi–Primitive Hierarchical Stereo Analysis and Multiple Depth Cues," SPIE, vol. 1956, pp. 250–262 (1993).

R. Surdick et al., "Relevant Cues For the Visual Perception of Depth: Is Where You See It Where It Is?," Proceedings on the 38th Meeting On Human Factors and Ergonomics Society, pp. 1305–1309 (1994)).

R. Srinivasan et al., "Computing Surface Information From Monocular and Binocular Cues For Vision Applications," Proceedings of the 27th Conference of Decision and Control, pp. 1085–1089 (1988).

S. Das et al., "Dynamic Integration Of Visual Cues For Position Estimation," SPIE, vol. 1382, pp. 341–352 (1990).

*Primary Examiner*—Scott Rogers
*Attorney, Agent, or Firm*—Kenyon & Kenyon

[57] ABSTRACT

One or more monocular cues are extracted from an original image and combined to enhance depth effect. An original image is acquired and segmented into one or more objects. The objects are identified as being either in the foreground or the background, and an object of interest is identified. One or more depth cues are then extracted from the original image, including shading, brightness, blur and occlusion. The depth cues may be in the form of one or more intermediate images having an improved depth effect. The depth cues are then combined or applied to create an image with enhanced depth effect.

22 Claims, 5 Drawing Sheets

INTEGRATION OF MONOCULAR CUES TO IMPROVE DEPTH PERCEPTION

BACKGROUND

The present invention relates to image processing, and more particularly to a novel approach for using monocular cues acquired from a single two dimensional image to improve depth perception.

Traditionally, the ability to perceive depth from two-dimensional images has been accomplished by binocular methods. Binocular methods are discussed in D. Marr and T. Poggio, "Cooperative Computation of Stereo Disparity," Science, vol. 194, pp. 283–287 (1976) and S. Barnard and M. Fischler, "Computational Stereo," Computing Surveys, vol. 14, no. 4, pp. 553–572 (December, 1982). Binocular depth cues, such as disparity, required multiple images (i.e., a stereo pair of images) and matching of corresponding points, which is a computationally complex and error-prone task. More recently, researchers have developed monocular approaches by comparing images using differing apertures, as discussed in A. Pentland, "a New Sense For Depth of Field," IEEE Transactions on Pattern Analysis and Machine Intelligence," vol. 9, no. 4 (July, 1987) and G. Surya and M. Subbarao, "Depth From Defocus By Changing Camera Aperture: a Spatial Domain Approach," Proceedings of IEEE Transactions on Pattern Analysis and Machine Intelligence, pp. 61–67 (1993). Monocular depth cues such as blur, have been used to perceive depth. In these approaches, point matching was not required, but multiple images were required for depth perception.

Researchers have begun looking at integration of binocular and monocular cues. Several researchers have studied the result of combining cues to perceive depth from two dimensional images. Examples of this type of work include N. Gershon, "Visualizing 3D PET Images," IEEE Computer Graphics and Applications, vol. 11, no. 3, pp. 11–13 (1991), and S. Marapane and M. Trivedi, "An Active Vision System For Depth Extraction using Multi-Primitive Hierarchical Stereo Analysis and Multiple Depth Cues," SPIE, vol. 1956, pp. 250–262 (1993).

Others have studied how these different cues interact to create a depth effect. In these studies, binocular cues have been considered important and large contributors to depth perception in two dimensional images. However, as noted above, multiple images are required to extract these cues. Examples of this type of work include R. Surdick et al., "Relevant Cues For the Visual Perception of Depth: Is Where You See It Where It Is?," Proceedings on the 38th Meeting On Human Factors and Ergonomics Society, pp. 1305–1309 (1994), R. Srinivasan et al., "Computing Surface Information From Monocular and Binocular Cues For Vision Applications," Proceedings of the 27th Conference of Decision and Control, pp. 1085–1089 (1988), and S. Das et al., "Dynamic Integration Of Visual Cues For Position Estimation," SPIE, vol. 1382, pp. 341–352 (1990).

Therefore, a need exists for a method for improving depth perception using only monocular cues acquired from a single image.

SUMMARY OF THE INVENTION

The image processing techniques of the present invention for modifying an image to enhance depth effect improve upon the prior art by using only monocular cues which are extracted from a single image.

The image processing techniques of the present invention involve extracting one or more depth cues from a single two-dimensional image, and then combining these cues to create a three-dimensional effect.

First, an original image is acquired and stored in memory. Next, objects in the original image are identified and segmented. A segmentation map can be generated which identifies each object in the original image. Each object in the original image is then identified as being either in the foreground or in the background. An object of interest is identified (usually located in the foreground). One or more depth cues are then extracted from the original image, including shading, brightness, blur and occlusion cues. The depth cues may be in the form of one or more intermediate images having an improved depth effect.

A shadow can be generated by extracting the shape of the object of interest in the foreground and darkening it to grey like a shadow. An intermediate shadow image is generated by applying the darkened shadow to the background or one or more background objects to create a shading effect. An intermediate brightness image can be created by increasing the relative intensity or brightness of the object of interest. An intermediate blur image can be generated by blurring the original image, or by blurring all objects other than the object of interest.

One or more of the intermediate images may be combined to generate a combined image. The combined image is then further enhanced by enlarging the object of interest, thereby further occluding the other objects in the combined image. Rather than generating intermediate images in parallel, each of the four cues can be extracted and applied sequentially to the original image, and without generating intermediate images. It is not necessary to apply all four depth cues to achieve an enhanced depth effect. One or more of the cues can be applied to enhance depth. A plurality of depth cues should be combined for optimum results.

DETAILED DESCRIPTION

Figure 1:
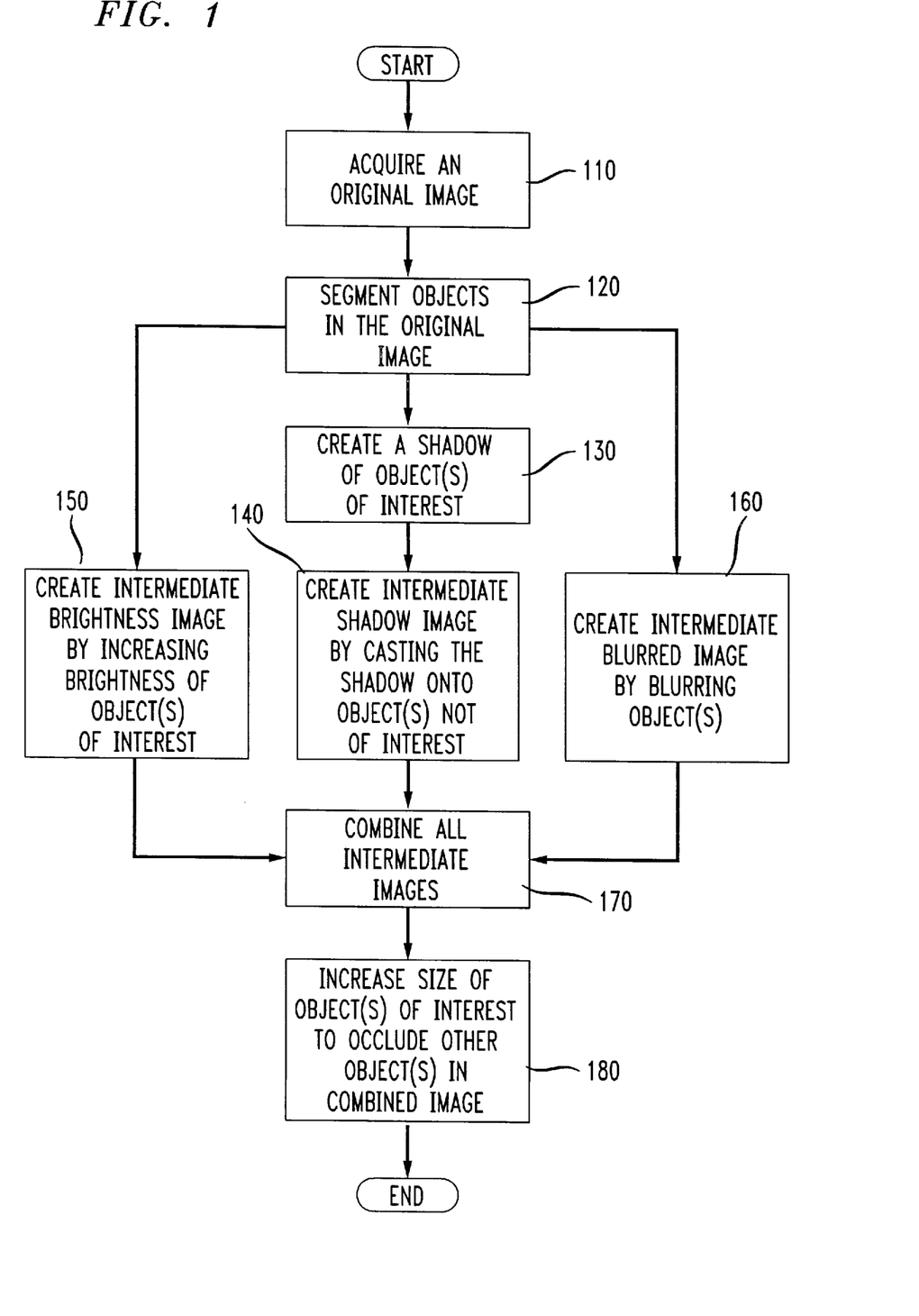
FIG. 1 illustrates a flow chart for modifying an image using monocular cues to improve depth perception according to an embodiment of the present invention.

Referring to the Figures in which like numerals indicate like elements, FIG. 1 illustrates a flow chart for modifying an image using monocular cues to improve depth perception according to an embodiment of the present invention. Depth cues are used to perceive depth and dimensionality. The present invention involves extracting the depth cues from a single two-dimensional image, and then combining these cues to create a three-dimensional effect. In the embodiment illustrated in FIG. 1, the depth cues used to improve depth perception are shading, brightness, blur and occlusion. Other depth cues could also be used.

Referring to FIG. 1, in step 110, an image is acquired using a camera or a similar device. This original image is digitized (if not already in digital form) and stored in memory. The image can be a bit-mapped image of N×N pixels. Each pixel has an associated intensity or brightness for a monochrome image (i.e., grey scale) or an associated color for a color image. Each pixel in a monochrome image can be represented, for example, using eight bits, providing 256 intensity values from 0 to 255, with 0 being the darkest or lowest intensity and 255 being the brightest or highest intensity. Although embodiments of the present invention are discussed in terms of a monochrome image, the present invention is equally applicable to a color image.

In step 120, the original image is segmented into one or more objects. Objects in an image can be segmented using available techniques.

For example, using one technique, separate images of several objects (i.e., a person, a book and a desk) can be separately obtained and stored in memory. A computer can then identify each object in the original image by matching the objects (i.e., matching the shape and/or color/intensity of the objects) in each of the separate images to the objects in the original image.

A second technique for segmenting objects is to segment or group pixels in close proximity to each other which have the same (or approximately the same) intensity or color.

A third technique can be used to segment objects based on detected motion. Using this third technique, a plurality of successive frames of the same image are taken over a period of time from the same point and stored. The intensity or color of corresponding pixels of each frame are compared to identify any pixels which have changed (indicating motion). Pixels which have changed and which are in close proximity to each other can be grouped together as one or more segmented objects.

After the objects have been segmented, a segmentation map is generated for each segmented object identifying the location and boundaries of each object in the original image. A segmentation map, for example, can be a binary image in which the object is white (i.e., a pixel value of 255), and all else is black. Each of the objects in the original image are then identified as being either in the foreground or the background. This can be performed manually by inspecting the original image. Also, one or more objects of interest in the original image can be identified. Typically, the object of interest is a person or item in the foreground of the image.

In step 130, a shadow of the object(s) of interest (or an object in the foreground) is generated from the original image. Shading (i.e., use of a shadow) improves depth perception because the object casting the shadow appears to be in front of the object on which the shadow has been cast. The shadow can be generated by extracting the shape of the object of interest in the foreground and darkening it to grey like a shadow.

In step 140, the generated shadow is then applied to background objects in the original image to create an intermediate shadow image. It is most beneficial to use shading to improve depth perception when background objects are close enough to have a shadow cast on them. As a result, it may not be effective to use the shading cue when the background objects are too far away from the foreground object of interest.

In step 150, the brightness or intensity of the foreground object of interest in the original image is increased to create an intermediate brightness image. In the brightness cue, closer objects appear brighter than more distant ones. Therefore, the present invention exaggerates the brightness of closer objects by increasing their intensities. For example, all pixels of the object(s) of interest may be increased by 20 (for pixel intensities ranging from 0 to 255). The brightness cue can always be used to improve depth perception regardless of the relative location of background objects compared to the location of the foreground object of interest. Alternatively, all objects other than the object of interest can be decreased in intensity to achieve the brightness effect.

In step 160, one or more objects are blurred to create an intermediate blur image. Blur is a measure of loss of detail in an image. In the blur cue, when an object is in focus, other objects are blurred. The amount of blur depends on the distance from the focused object. In the present invention, one or more objects (or portions thereof) are blurred to exaggerate the depth of objects in the image. Blurring can always be used regardless of the relative location of the object of interest. Blurring is the most effective cue in enhancing depth perception.

Different blurring techniques can be used to exaggerate the depth of objects in an image. In a first blurring technique, the foreground object of interest is removed from the original image. The remaining image is then blurred. The object of interest is then superimposed on the remaining image to create the intermediate blur image. Alternatively, it is unnecessary to remove the foreground object of interest. The (focused) foreground object of interest can be copied, and then superimposed over the entire blurred image to achieve the desired depth effect.

A second blurring technique uses radial blurring of the image. A point on the original image which is closest to the viewer is selected, such as the edge of a book or a person's nose. The selected point is not blurred because it is the closest point in the image and should remain in focus. The entire original image is increasingly blurred outwardly or radially from the selected point. The amount of blurring in the image increases in proportion to the distance from the selected point. Alternatively, the entire image (other than the selected point or area) can be blurred a fixed amount.

In addition, a blurred image is the response of the camera to a single point source. This response is called the camera point spread function (PSF), h(x,y), which can be approximated as a Gaussian function:

$$h(x, y) = \frac{1}{2\pi\sigma^2} e^{-\frac{1}{2}\frac{x^2+y^2}{\sigma^2}}.$$

a blurred image g(x,y) can be generated by convolving an original focused image f(x,y) with the PSF h(x,y):

$$g(x,y)=f(x,y)*h(x,y),$$

where x and y are indices indicating positions in the image, and σ is a constant chosen by the user to affect blurring. In a Gaussian function, σ is the variance. In the above equation for h(x,y), σ affects the width or range of pixels blurred.

In step 170, all three depth-enhanced intermediate images are combined. The intermediate images can be combined additively by adding the corresponding pixel values from the three intermediate depth-enhanced images. Each of the cumulative pixel values is then divided by three. Therefore, there is equal contribution from the shading cue, the brightness cue and the blur cue to generate the combined image.

Alternatively, the cues may be weighted unequally. For example, because blur can be the most effective cue, the blur cue can be given more weight than the other cues. For example, this can be done by multiplying pixel values of the intermediate blur image by 2, adding the pixel values of the intermediate blur image to the other intermediate pixel values, and then dividing the cumulative pixel values by 4 to give more weight to the blur cue. In this example, the blur cue contributes 50%, while, the shading and brightness cues each contribute 25%.

In step 180, the foreground object of interest is increased in size to occlude or block even more of other objects in the combined image. Occlusion indicates that the occluded object is farther away from the occluding object (the object of interest). An embodiment of the present invention generates the occlusion effect by enlarging or increasing the size of the foreground object of interest to make the foreground object of interest appear closer. Alternatively, the remaining (background) objects can be decreased in size to provide the same occlusion effect. Although not required, the step 180 (occlusion) should be performed after combining the other three cues (intermediate depth-enhanced images) because step 180 changes the geometry of the image.

The method of FIG. 1 illustrates only one embodiment of the present invention for improving depth perception of an image using monocular cues extracted from a single image. According to the present invention, other methods using monocular cues similar to FIG. 1 may be employed to improve depth perception. For example, while the embodiment of FIG. 1 uses all four depth cues (shading, brightness, blur and occlusion) to improve depth perception, any combination of one or more of the depth cues can be used to improve depth perception. These cues can be performed or applied to the original image in any order. Also, the method illustrated in FIG. 1 generates three intermediate images in parallel at steps 140, 150 and 160. Alternatively, each depth cue may be applied to the original image sequentially or serially and without generating intermediate images.

Figure 2A:
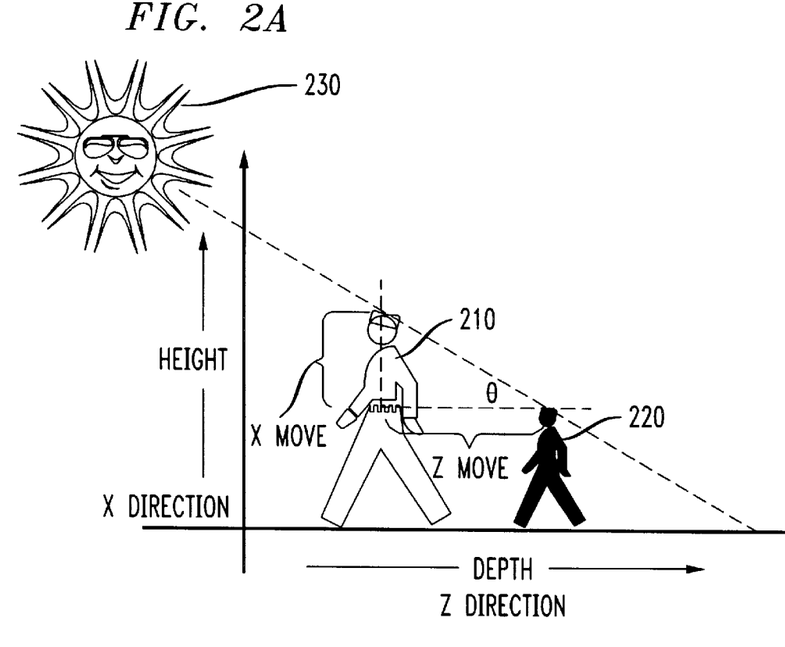
FIGS. 2A and 2B illustrate a technique for creating a shadow of an object of interest and casting the shadow onto a background object according to an embodiment of the present invention.
Figure 2B:
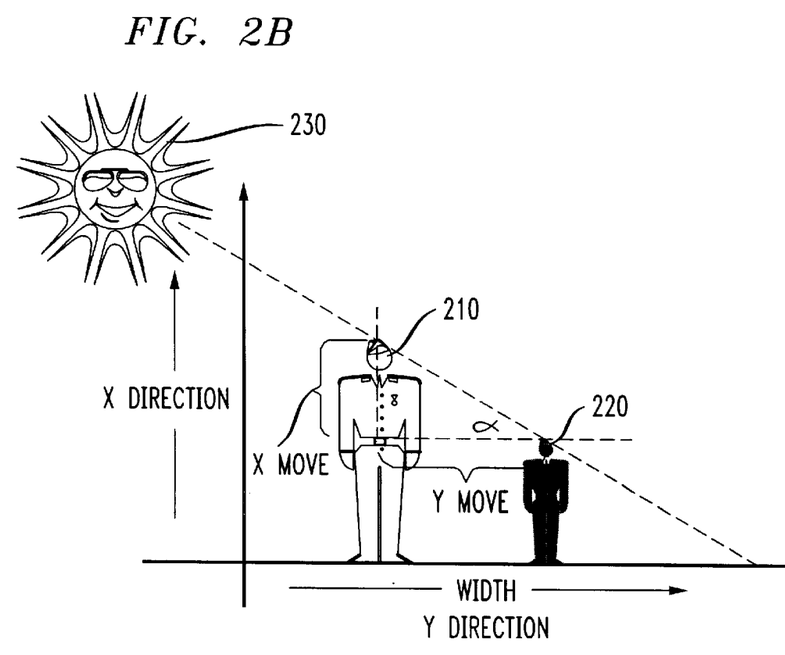

FIGS. 2A and 2B illustrate an embodiment for creating a shadow of an object of interest and casting the shadow onto a background object (steps 130 and 140, FIG. 1). Referring to FIGS. 2A and 2B, an object of interest (such as a person) 210 is located in the foreground. The person's shadow 220 will be positioned in the background at a distance $Z_{move}$ behind the person 210 to improve depth perception. A light source (such as the sun or a lamp) is assumed to exist and shines down at an angle θ with the Z direction (FIG. 2A) and an angle α with the Y direction (FIG. 2B). $Z_{move}$, α and ∂ can be manually selected based on experimentation and which most effectively improve depth perception.

Once, the depth of shadow 220 ($Z_{move}$) and the angles α and θ have been selected, trigonometry can be used to determine how much shadow 220 will be displaced in the X (height) direction ($X_{move}$) and how much the shadow will be displaced in the Y (width) direction ($Y_{move}$) from person 210 in the image. In other words, the values $X_{move}$ and $Y_{move}$ indicate the location of shadow 220 in the image relative to the location of person 210.

Using trigonometry, $X_{move}$ may be calculated as:

$X_{move} = Z_{move} \tan \theta$. Therefore, if a user would like to cast a shadow five feet behind person 210 in an image with the light or sun at θ=10°, then shadow 220 will be:

$X_{move}$=5 feet (tan 10°)=0.88 feet shorter than person 210.

In order to place the shadow in the image, the $X_{move}$ value in feet must be transformed to pixels. The pixel displacement of shadow 220 in the X direction may be calculated as follows:

$X_{pixels} = (X_{move})$ (No. of pixels/foot)

For example, if there are 100 pixels for every foot in the image, then shadow 220 will be $X_{pixels}$=0.88 feet (100 pixels/foot)=88 pixels lower than person 210 in the image.

Similarly, $Y_{move}$ may be calculated as:

$Y_{move} = X_{move}/\tan \alpha$. And the Y displacement of shadow 220 in pixels can similarly be calculated as:

$Y_{pixels} = (Y_{move})$ (No. of pixels/foot).

The shadow 220 is generated and applied to the image by extracting the shape of person 210, and darkening pixels in the shape of person 210 to create shadow 220. The pixels which are darkened to create shadow 220 will be located in the image at the calculated shadow position ($X_{pixels}$, $Y_{pixels}$). For example, the pixels located at the calculated shadow position can be darkened by 50 pixel values (on a scale of 0-255) to create shadow 220 in the shape of person 210. The generated shadow is placed in the original image at the relative shadow position ($X_{pixels}$, $Y_{pixels}$) by darkening pixels at the relative shadow position to a grey level.

There may exist several objects in the foreground which should cast a shadow onto the background objects. In such case, the combined shape of the foreground objects should be used to generate and cast the shadow onto the background.

Figure 3:
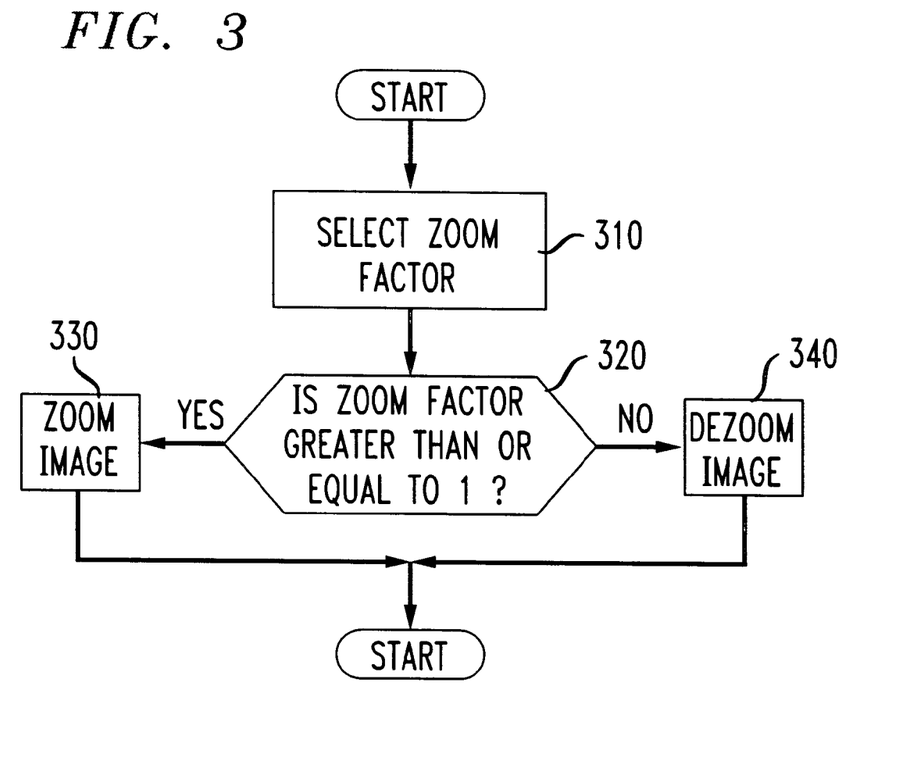
FIG. 3 illustrates a method for increasing or decreasing the size of an image according to an embodiment of the present invention.

FIG. 3 illustrates an embodiment for increasing the relative size of the object of interest to occlude even more of other objects in the combined image (step 180, FIG. 1). Referring to FIG. 3, at step 310, a zoom factor is selected, typically between zero and two. For example a zoom factor of 0.8 will reduce the image to 80% of its original size, while a zoom factor of 1.5 will increase the size of the image to 150% of its original size. A zoom factor of 1.3, for example, can be used to increase the size of the foreground object of interest by 30%, thereby to occlude more of the remaining objects in the image. In such case, only the object of interest is increased in size. The enlarged foreground object is then superimposed on the image to obtain the occlusion effect.

A zoom factor of 0.7, for example, can be used to reduce the size of all objects other than the object of interest. In such case, the image (other than the object of interest) would be reduced (or dezoomed) to 70% of its original size. The foreground object of interest (having its original size) is then superimposed over the reduced image to provide the occlusion effect.

At step 320 of FIG. 3, it is determined whether or not the zoom factor is greater than or equal to one. If the zoom factor is greater than or equal to one, this indicates a zoom operation (increase the size of the object or image), and flow proceeds to step 330. At step 330, the object of interest is zoomed or increased in size based on the zoom factor.

If the zoom factor is less than 1, this indicates a dezoom operation on the image or objects, and flow proceeds to step 340. At step 340, the image or object is dezoomed.

An image can be zoomed by supersampling the image. Using this technique, each pixel in the original image is duplicated one or more times to increase the size of the image.

An image can be dezoomed or decreased in size by sub-sampling the image. Using this technique, a plurality of pixels in the image are sampled and replaced with a single pixel. For example, every third pixel in the original image can be duplicated in the dezoomed image (deleting the other two pixels), or every three pixels can be averaged to obtain a single pixel value to replace the three pixels.

The following algorithm or code can be used for the zoom/dezoom operation according to an embodiment of the present invention:

```
1   zoom = 1.2; (in this example, zoom is set to 1.2)
2   for (i=x; i<x+sizex; ++i)
3   {
4     for (j=y; j<y+sizeY; ++j)
5     {
6       for (k=0.0; k<zoom; k+=1.0);
7         For (L=0.0; L<zoom; L+=1.0); (for horizontal
8             and vertical space to be zoomed)
9         {
1o          if ((int) segmentMap[i] [j]==255)
11            NewImage [(int) (m+k)] [(int) (n+L)]=
12                OldImage[i] [j];
13        }
14     n+=zoom; (move to the next horizontal position
15            in new image; repeat zoom.)
16     }
17     m+=zoom; n=0.0;
18   }    (move to next vertical position in new
19        image; repeat zoom).
```

The above algorithm provides one embodiment for super-sampling or sub-sampling an object, depending on whether zoom is greater than one (for zoom operation) or less than one (for dezoom). The original or old image is of size (sizeX, sizeY). An object in the old image which will be zoomed by 20% (zoom=1.2) in this example is identified by the segmentation map (segmentMap). The object to be zoomed is white (pixel value of 255) in the segmentation map, and all else in the map is black. In lines 10–12 of the above algorithm, if pixel i,j is part of the object to be zoomed, then pixel i,j is copied to location m+k, n+1 in a new image (newImage). The pixel i,j in the original image (oldImage) is copied "zoom" times vertically and horizontally in the new image.

Figure 4A:
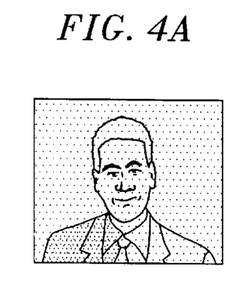
FIGS. 4A–4E illustrate the application of blur, shading and brightness depth cues according to an embodiment of the present invention to enhance depth perception.
Figure 4B:
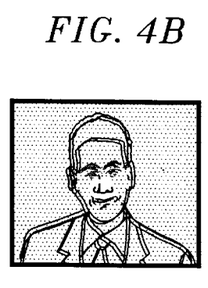
Figure 4C:
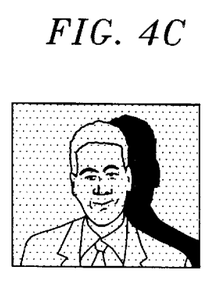
Figure 4D:
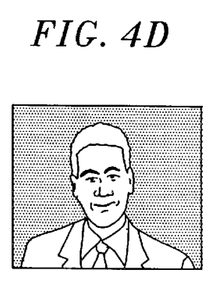
Figure 4E:
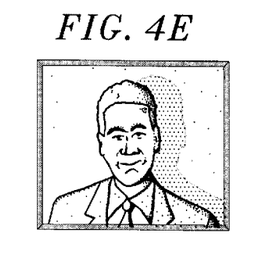

FIGS. 4A–4E illustrate the application of blur, shading and brightness depth cues to enhance depth perception. FIG. 4A is an original image of a person, which is the object of interest in the foreground of the image. FIG. 4B illustrates an intermediate blur image wherein the entire original image is blurred except for the nose region of the person. This provides the appearance that the nose is closer to the viewer than the remaining items in the image, thereby enhancing depth. FIG. 4C illustrates an intermediate shadow image achieved by casting a shadow in the shape of the person onto the original image. In this case, the shadow is in the shape of part of the person's outline or profile. FIG. 4D illustrates an intermediate brightness image which is achieved by increasing the intensity or brightness of the person in the original image, while decreasing the intensity of the remaining portion of the image (i.e., the background of the image). FIG. 4E illustrates an image with enhanced depth perception based on the depth cues illustrated in FIGS. 4B, 4C and 4D. The image of FIG. 4E is achieved by combining the intermediate images of FIGS. 4B, 4C and 4D.

Figure 5A:
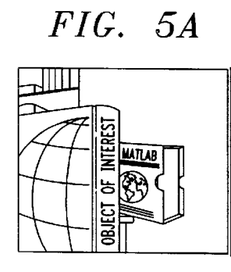
FIGS. 5A–5D illustrate the application of blur and occlusion depth cues according to an embodiment of the present invention to enhance depth perception.
Figure 5B:
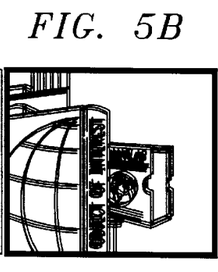
Figure 5C:
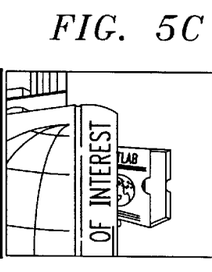
Figure 5D:
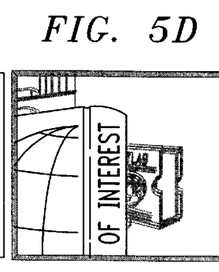

FIGS. 5A–5D illustrate the application of blur and occlusion depth cues to enhance depth perception. FIG. 5A is an original image which includes a portion of a book (object of interest) in the foreground and some background objects, including a MATLAB box. FIG. 5B illustrates an intermediate blur image in which all objects in the original image have been blurred. FIG. 5C illustrates an intermediate occlusion image in which only the book in the foreground (object of interest) has been zoomed or increased in size. FIG. 5D illustrates an image with enhanced depth perception based on the depth cues illustrated in FIGS. 5B and 5C. The image of FIG. 5D is achieved by combining the intermediate images of FIGS. 5B and 5C. To combine FIGS. 5B and 5C, only the enlarged or zoomed foreground object is superimposed onto the intermediate blur image of FIG. 5B, thereby to further occlude the remaining background objects, and provide increased blurring of the background objects.

Figure 6:
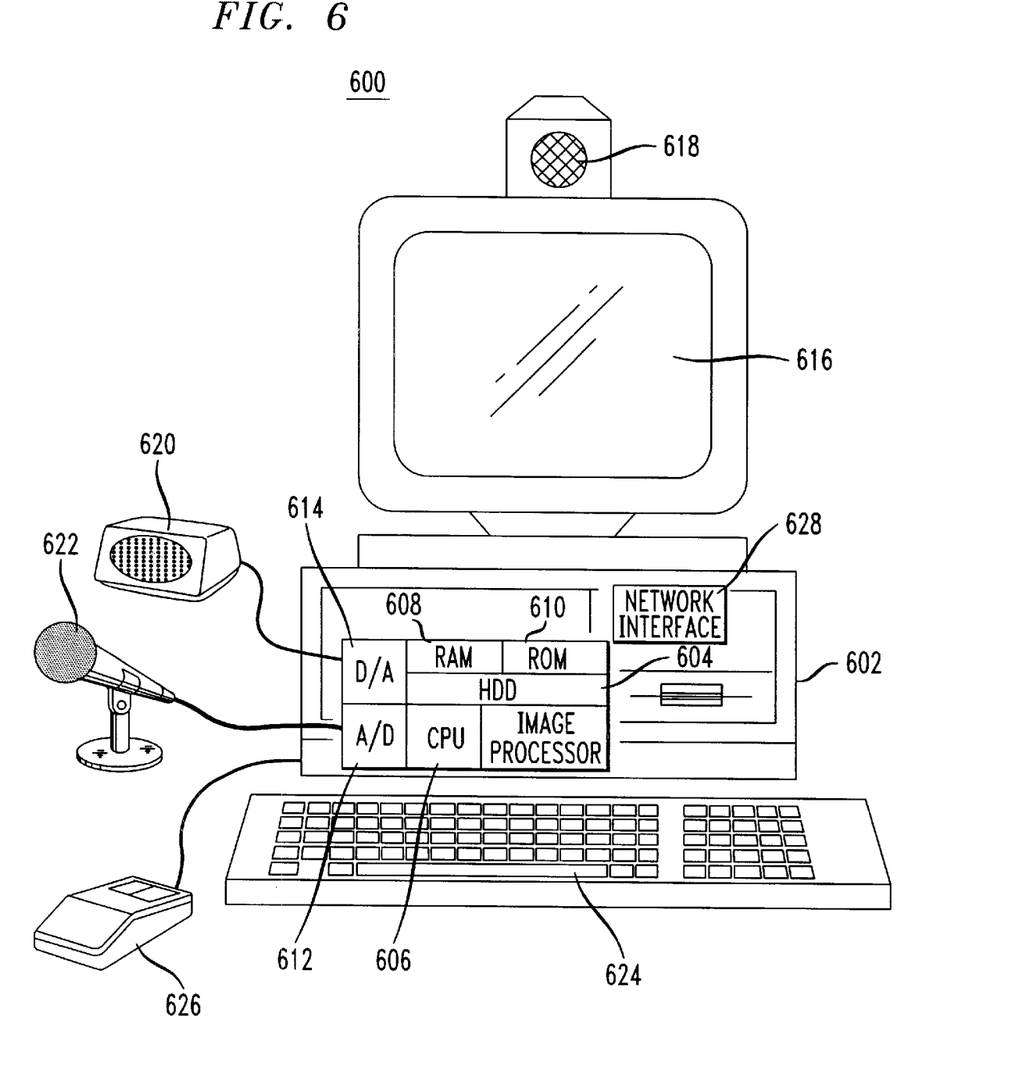
FIG. 6 illustrates a block diagram of an embodiment of a computer system which may be used to implement the present invention.

FIG. 6 illustrates a block diagram of an embodiment of a computer system which may be used to implement the present invention. Computer system 600 is a conventional computer system and includes a computer chassis 602 housing the internal processing and storage components, including a hard disk drive (HDD) 604 for storing software and other information, a central processing unit (CPU) 606 coupled to HDD 604, such as a Pentium® processor manufactured by Intel Corporation, for executing software and controlling overall operation of computer system 600. An image processor 607 is coupled to CPU 606 for processing received images. Computer system 600 also includes a random access memory (RAM) 608, a read only memory (ROM) 610, an analog-to-digital (A/D) converter 612 and a digital-to-analog (D/A) converter 614, which are also coupled to CPU 606 and image processor 607. Computer system 600 also includes several additional components coupled to CPU 606 and image processor 607 including a monitor 616 for displaying video images and other information to the user, a video input device 618, such as a camera, a scanner or like for capturing video images, a speaker 620 for outputting audio, a microphone 622 for inputting audio, a keyboard 624 and a mouse 626. Computer system 600 also includes a network interface 628 for connecting computer system 600 to other computers via a computer network link. The computer network link may include one or more of a variety of computer networks, including the Internet, and Intranet, a local area network (LAN), a wide area network (WAN) or the like. Network interface 628 may be any conventional interface, such as an Ethernet card for connecting to a local area network (LAN), a modem for connecting to the Internet, etc. Some of the components of computer system 600 can be coupled to one another in a conventional manner, such as through one or more busses, such as a data bus, an address bus and a control bus.

Video input device 618 receives one or more video images. If the received images are in analog form, each image is passed through A/D converter 612 to generate bitmapped image. The digital bit mapped image is then stored in HDD 604 for processing. If video input device 618 outputs a digital bitmapped image, this image is stored is HDD 604 without use of A/D converter 612.

Under control of CPU 606, image processor 607 modifies the received image to enhance depth effect. In one embodiment, image processor 607 generates a plurality of depth cues including cues for shading, brightness, blur and occlusion. Each depth cue may be in the form of an intermediate depth enhanced image which is stored in memory. Each of the depth cues are then combined to create an image having enhanced depth effect.

The advantage of the present invention is the use of one or more monocular cues acquired from a single two-dimensional image to enhance depth effect. For example, a two-dimensional image may be obtained, and one or more monocular cues acquired from the image. A pseudo-3D image can then be generated by combining the monocular cues to enhance depth effect. The result is a two dimensional image with greatly improved depth perception (i.e., a pseudo 3D image). This pseudo 3D image may then be transmitted via a computer network to another computer system for display.

There exist many applications in which a three dimensional type depth effect is desirable. It is not practicable, however, in many instances to provide actual three-dimensional (3D) images due to the high bit rate or bandwidth requirements for transmitting 3D images. Such applications include real-time video transmission, such as video conferencing over a computer network, and virtual applications, such as virtual reality games. Also, the techniques of the present invention are very attractive for MPEG4 in low bitrate video coding and in video synthesis.

What is claimed is:

1. A method of using monocular depth cues in a single two dimensional image to improve depth perception in the image, said method comprising the steps of:

obtaining an image, said image comprising one or more objects, each of said objects in the image being either in the foreground or the background of the image;

segmenting said one or more objects in the image;

identifying which of said objects are in the foreground and which of said objects are in the background of the image;

increasing the brightness of one or more said foreground objects relative to the brightness of one or more of said background objects in the image;

blurring one or more said background objects in said image, said steps of increasing and blurring operating to improve depth perception of the image;

generating a shadow of one or more said foreground objects in the image; and casting the generated shadow on one or more said background objects in the image.

2. A method of using monocular depth cues in a single image to improve depth perception in the image, said method comprising the steps of:

obtaining an image, said image comprising one or more objects, each of said objects in the image being either in the foreground or the background of the image;

segmenting said one or more objects in the image;

identifying which of said objects are in the foreground and which of said objects are in the background;

increasing the brightness of one or more said foreground objects relative to the brightness of one or more of said background objects in the image;

generating a shadow of one or more said foreground objects in the image; and casting the generated shadow on one or more said background objects in the image, said steps of increasing, generating and casting operating to improve depth perception of the image.

3. The method of claim 2 and further comprising the step of increasing the size of one or more said foreground objects relative to the size of one or more said background objects in said image.

4. A method of using monocular depth cues in a single image to improve depth perception in the image, said method comprising the steps of:

obtaining an image, said image comprising one or more objects, each of said objects in the image being either in the foreground or the background of the image;

segmenting said one or more objects in the image;

identifying which of said objects are in the foreground and which of said objects are in the background;

blurring one or more said background objects in said image;

generating a shadow of one or more said foreground objects in the image;

and casting the generated shadow on one or more said background objects in the image, said steps of blurring, generating and casting operating to improve depth perception of the image.

5. The method of claim 4 and further comprising the step of increasing the size of one or more said foreground objects relative to the size of one or more said background objects in said image.

6. A method of using monocular depth cues in a single image to improve depth perception in the image, said method comprising the steps of:

obtaining an image, said image comprising one or more objects, each of said objects in the image being either in the foreground or the background of the image;

segmenting said one or more objects in the image;

identifying which of said objects are in the foreground and which of said objects are in the background;

generating a shadow of one or more said foreground objects in the image;

casting the generated shadow on one or more said background objects in the image; and increasing the size of one or more said foreground objects relative to the size of one or more said background objects in said image, said steps of generating, casting and increasing operating to enhance depth perception of the image.

7. A method of using monocular depth cues in a single image to improve depth perception in the image, said method comprising the steps of:

obtaining an image, said image comprising one or more objects, each of said objects in the image being either in the foreground or the background of the image;

segmenting said one or more objects in the image;

identifying which of said objects are in the foreground and which of said objects are in the background;

increasing the brightness of one or more said foreground objects relative to the brightness of one or more of said background objects in the image;

blurring one or more said background objects in said image;

generating a shadow of one or more said foreground objects in the image;

casting the generated shadow on one or more said background objects in the image; and increasing the size of one or more said foreground objects relative to the size of one or more said background objects in said image, said steps of increasig the brightness, blurring, generating, casting and increasing the size operating to enhance depth perception of the image.

8. The method of claim 7 wherein said step of segmenting comprises the step of grouping like pixels together based on intensity which are in close proximity to one another, each said pixel group comprising a segmented object.

9. The method of claim 7 wherein said step of segmenting comprises the steps of:

obtaining a plurality of successive frames of an image from the same point;

comparing corresponding pixels in each of the plurality of frames;

identifying, based on said step of comparing, any pixels which have changed; and grouping together pixels in close proximity which have changed, each said pixel group comprising a segmented object.

10. The method of claim 7 wherein said step of increasing the brightness of one or more said foreground objects comprises the step of decreasing the brightness only of one or more of said background objects in the image.

11. The method of claim 7 wherein said step of increasing the brightness of one or more said foreground objects comprises the step of increasing the brightness of only one or more said foreground objects.

12. The method of claim 7 wherein said step of blurring comprises the steps of:
removing one or more said foreground objects from the image leaving a remaining image;
blurring the objects in the remaining image; and
superimposing the removed foreground objects onto the blurred remaining image.

13. The method of claim 7 wherein said step of blurring comprises the step of convolving an original focused image with a point spread function to obtain a blurred image.

14. The method of claim 7 wherein said step of generating a shadow comprises the steps of:
calculating the x position of the shadow; and
calculating the y position of the shadow.

15. The method of claim 14 wherein said step of casting the generated shadow comprises the step of decreasing the brightness of pixels at the calculated position of the shadow in the image and in the shape of one or more of said foreground objects.

16. The method of claim 7 wherein said step of increasing the size of one or more said foreground objects comprises the steps of:
removing one or more said foreground objects from the image leaving a remaining image;
supersampling the pixels in the removed foreground objects to generate one or more larger foreground objects; and
superimposing the one or more larger foreground objects onto the remaining image.

17. A method of using monocular depth cues in a single image to improve depth perception in the image, said method comprising the steps of:
obtaining an original image, said original image comprising one or more objects, each of said objects in the image being either in the foreground or the background of the image;
segmenting said one or more objects in the image;
identifying which of said objects are in the foreground and which of said objects are in the background;
creating an intermediate bright image by increasing the brightness of one or more said foreground objects in the original image relative to the brightness of one or more of said background objects;
creating an intermediate blurred image by selectively blurring one or more said background objects in said original image;
creating an intermediate shadow image by performing steps a) and b):
a) generating a shadow of one or more said foreground objects in the original image; and
b) casting the generated shadow on one or more said background objects in the original image; and
combining said intermediate bright image, said intermediate blurred image and said intermediate shadow image into a single final image having enhanced depth perception.

18. The method of claim 17 and further comprising the step of increasing the size of one or more said foreground objects relative to the size of one or more said background objects in said final image, thereby causing one or more said foreground objects to at least partially occlude one or more said background objects.

19. The method of claim 17 wherein said step of combining comprises the step of averaging corresponding pixel values from the intermediate bright image, the said intermediate blurred image and the intermediate shadow image to generate a combined image.

20. The method of claim 17 wherein said step of combining comprises the steps of:
adding together corresponding pixel values from the intermediate bright image, the said intermediate blurred image and the intermediate shadow image to generate cumulative pixel values for each pixel in the image; and
dividing each cumulative pixel value by three to generate a combined image.

21. A method of using monocular depth cues in a single image to improve depth perception in the image, said method comprising the steps of:
obtaining an image, said image comprising one or more objects, at least one of said objects being of interest;
segmenting said one or more objects in the image;
identifying which of said objects are of interest and the remaining objects not of interest;
increasing the brightness of said one or more objects of interest relative to the brightness of the remaining objects in the image not of interest;
blurring said remaining objects not of interest;
generating a shadow of said one or more objects of interest in the image;
casting the generated shadow of the objects of interest onto said one or more remaining objects in the image not of interest; and
increasing the size of said one or more objects of interest relative to the size of said one or more remaining objects in said image not of interest, said steps of increasing the brightness, blurring, generating, casting and increasing the size operating to enhance depth perception of the image.

22. A method of using monocular depth cues in a single image to improve depth perception in the image, said method comprising the steps of:
obtaining an image, said image comprising one or more objects, each of said objects in the image being either in the foreground or the background of the image;
segmenting said one or more objects in the image;
identifying which of said objects are in the foreground and which of said objects are in the background;
to adjust a view of a foreground object relative to a background object in the image, performing at least two operations selected from the group consisting of:
a) increasing the brightness of one or more said foreground objects relative to the brightness of one or more of said background objects in the image;
b) blurring one or more said background objects in said image;
c) generating a shadow of one or more said foreground objects in the image and casting the generated shadow on one or more said background objects in the image; and
d) increasing the size of one or more said foreground objects relative to the size of one or more said background objects in said image.

* * * * *